(12) United States Patent  (10) Patent No.: US 9,239,937 B2
Erickson et al.  (45) Date of Patent: Jan. 19, 2016

(54) TARGETED SECURITY POLICY OVERRIDE

(71) Applicant: Lenovo (Singapore) Pte. Ltd., Singapore (SG)

(72) Inventors: David Edward Erickson, Cary, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 211 days.

(21) Appl. No.: 13/736,019

(22) Filed: Jan. 7, 2013

(65) Prior Publication Data

US 2014/0195799 A1  Jul. 10, 2014

(51) Int. Cl.
*H04L 29/06* (2006.01)
*G06F 21/73* (2013.01)
*G06F 21/57* (2013.01)
*H04L 9/08* (2006.01)

(52) U.S. Cl.
CPC ............... *G06F 21/73* (2013.01); *G06F 21/57* (2013.01); *G06F 2221/2115* (2013.01); *H04L 9/0866* (2013.01); *H04L 9/0869* (2013.01)

(58) Field of Classification Search
None
See application file for complete search history.

(56) References Cited

U.S. PATENT DOCUMENTS

| | | | | |
|---|---|---|---|---|
| 7,784,106 | B2* | 8/2010 | Wheeler et al. | 726/34 |
| 8,607,046 | B1* | 12/2013 | Silberman et al. | 713/168 |
| 2004/0199768 | A1* | 10/2004 | Nail | 713/169 |
| 2005/0210477 | A1* | 9/2005 | Auerbach | G06Q 30/02 719/315 |
| 2005/0273841 | A1* | 12/2005 | Freund | G06F 21/57 726/1 |
| 2006/0224742 | A1* | 10/2006 | Shahbazi | H04L 63/20 709/226 |
| 2006/0242685 | A1* | 10/2006 | Heard et al. | 726/3 |
| 2006/0259785 | A1* | 11/2006 | Thibadeau | 713/193 |
| 2010/0064341 | A1* | 3/2010 | Aldera | 726/1 |
| 2013/0097683 | A1* | 4/2013 | Davis et al. | 726/7 |

* cited by examiner

*Primary Examiner* — Jason K. Gee
*Assistant Examiner* — Olanrewaju Bucknor
(74) *Attorney, Agent, or Firm* — Ference & Associates LLC

(57) ABSTRACT

An aspect provides a method, including: gathering, with an information handling device, client system identification data of a client system; providing, with the information handling device, the client system with at least one cryptographic key; transmitting, with the information handling device, the client system identification data and a request for security policy override to a third party; receiving, with the information handling device, encrypted approval data from the third party; and transmitting, with the information handling device, encrypted approval data to the client system. Other aspects are described and claimed.

20 Claims, 3 Drawing Sheets

TARGETED SECURITY POLICY OVERRIDE

BACKGROUND

Configuration of security settings throughout an enterprise environment has been a more common customer requirement, e.g., with the adoption of later WINDOWS operating systems. After enterprise computing systems (e.g., desktop computers) have been deployed in an enterprise environment to their user community, the enterprise administrators may want to deploy new software or features which might require modifications to the security settings on each individual computer system. Enterprise administrators also may have a requirement to modify other computer security settings.

In order to modify these settings without manually touching each of these computers, the administrator would prefer to utilize a software distribution and management system to schedule the implementation of these security settings. In most cases, each of the target computers would require a supervisor or administrator password to be installed on each of these systems. The administrator would thus in turn need to know this password in order to apply these security settings. If these computers do not have a supervisor or administrator password, it must be set in order to apply these security settings. A problem is that this password cannot be set in an operational environment (e.g., WINDOWS operating environment) without exposing the computer systems to denial-of-service attacks by a malicious individual.

BRIEF SUMMARY

In summary, one aspect provides a method, comprising: gathering, with an information handling device, client system identification data of a client system; providing, with the information handling device, the client system with at least one cryptographic key; transmitting, with the information handling device, the client system identification data and a request for security policy override to a third party; receiving, with the information handling device, encrypted approval data from the third party; and transmitting, with the information handling device, encrypted approval data to the client system.

Another aspect provides an information handling device, comprising: one or more processors; and a memory operatively coupled to the one or more processors that stores instructions executable by the one or more processors to perform acts comprising: gathering client system identification data of a client system; providing the client system with at least one cryptographic key; transmitting the client system identification data and a request for security policy override to a third party; receiving encrypted approval data from the third party; and transmitting encrypted approval data to the client system.

A further aspect provides a program product, comprising: a storage medium having computer program code embodied therewith, the computer program code comprising: computer program code configured to gather, with an information handling device, client system identification data of a client system; computer program code configured to provide, with the information handling device, the client system with at least one cryptographic key; computer program code configured to transmit, with the information handling device, the client system identification data and a request for security policy override to a third party; computer program code configured to receive, with the information handling device, encrypted approval data from the third party; and computer program code configured to transmit, with the information handling device, encrypted approval data to the client system.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
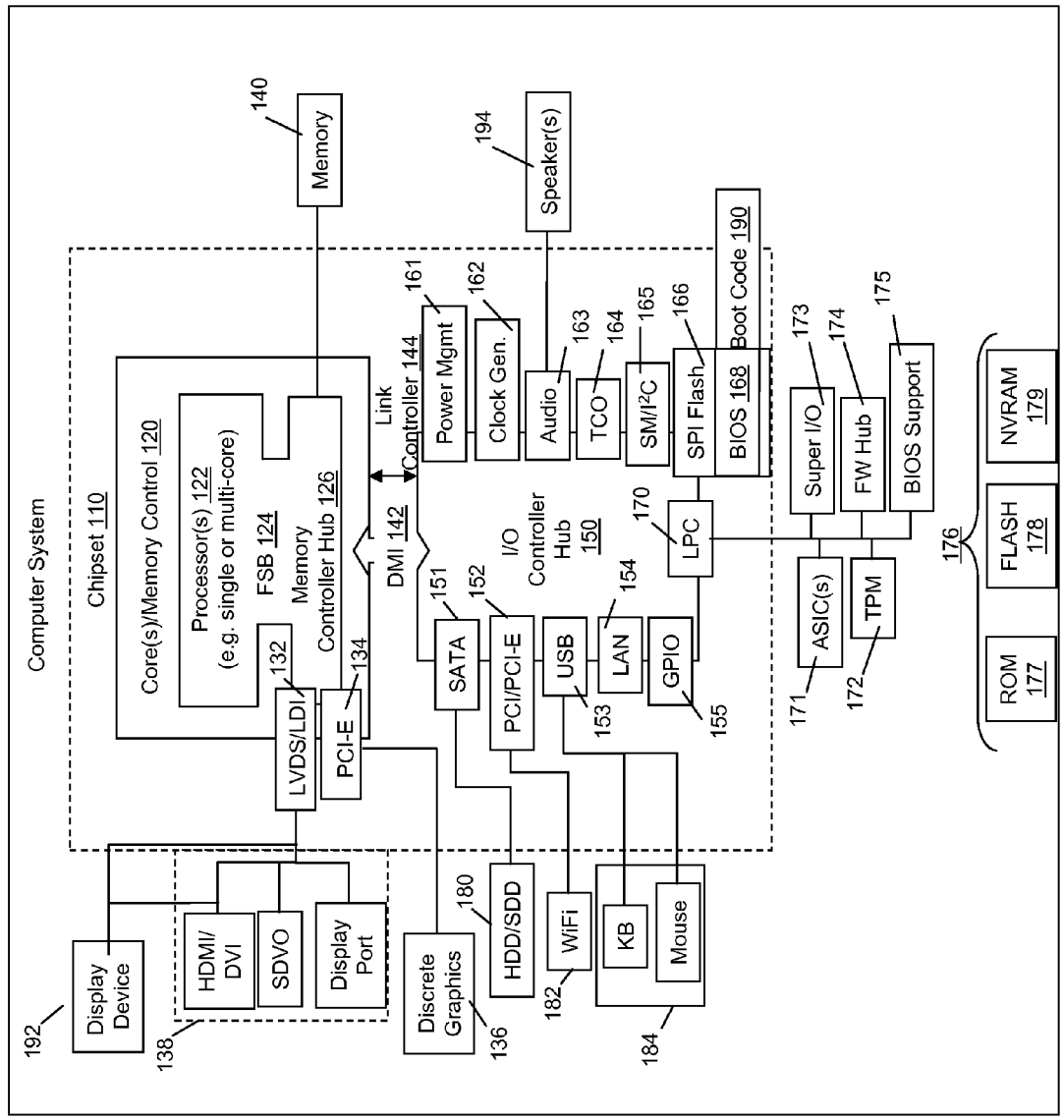
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

After enterprise computing systems (e.g., desktop computers) have been deployed in an enterprise environment to their user community, the enterprise administrators may want to make changes to the systems that require modifications to the security settings on each individual system. Currently, there are a number of potential solutions; however, none of these solutions are acceptable to the end customer.

First, an administrator may manually set the password on each system. This requires someone to manually touch each system to set the password. Since this would be a tightly controlled, common password, this approach requires someone from the enterprise administrator site to perform this function, which is costly and time consuming.

The password(s) necessary may be set as part of the manufacturing process. One drawback to this solution is the additional cost incurred by the customer for each system to be manufactured in a special way. In addition, this does not resolve the problem that is encountered when a need for the password is discovered after the systems have been manufactured.

A special password enabled BIOS or tool may be made available to allow the password to be set on the target systems. One difficulty with this approach is that a special BIOS would be required for each different computer model. Additionally, the required sequence of operations and number of system reboots makes this approach difficult to implement. Furthermore, it is difficult to control a special BIOS or tool so that it does not fall into the hands of a malicious individual.

Accordingly, an embodiment provides a solution in which a secure method of overriding security settings on a client system is provided without exposing all customers to a potential breach in security. In an embodiment, the enterprise administrator, from a central site, enables the supervisor or administrator BIOS password in the WINDOWS environment. This procedure may be used to override any BIOS imposed security process existing on the client system.

The illustrated example embodiments will be best understood by reference to the figures. The following description is intended only by way of example, and simply illustrates certain example embodiments.

FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices ("devices"), as for example outlined in FIG. 1, may include user devices or client systems in an enterprise setting, such as a laptop or desktop computing system. These client systems or devices may be the subject of security policy overrides, as further described herein.

Figure 2:
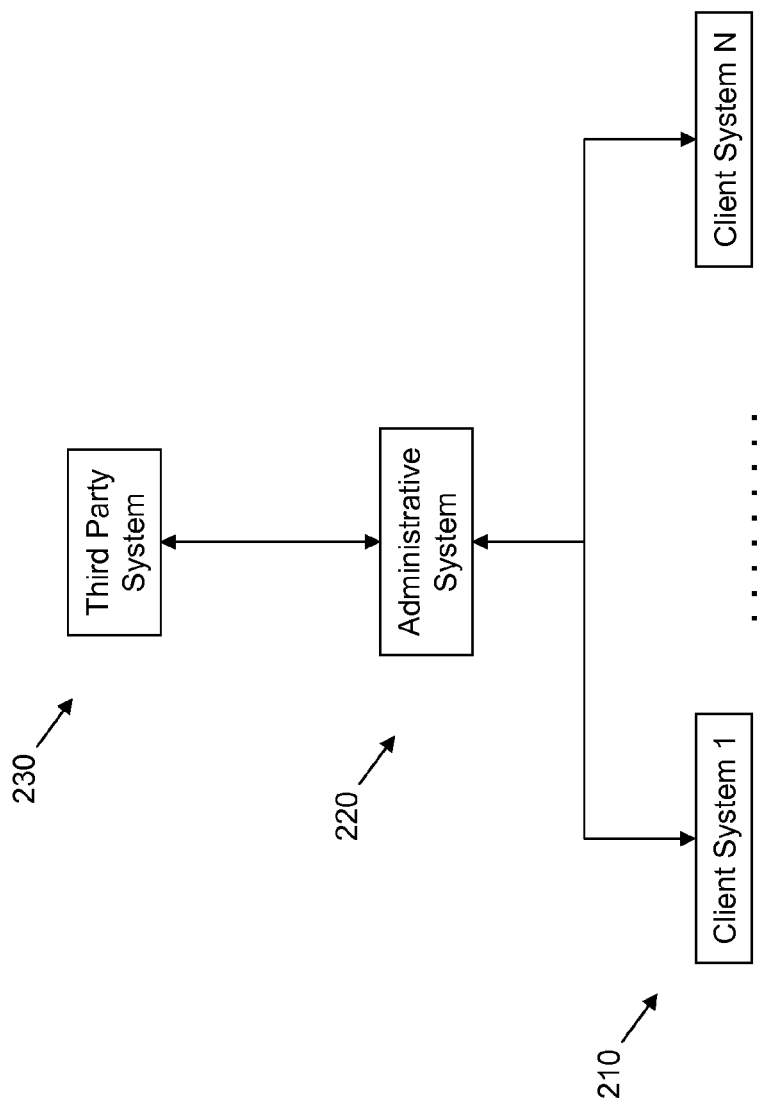
FIG. 2 illustrates an example targeted security policy override operating environment.

Referring to FIG. 2, an example operating environment for targeted security policy override is illustrated. The example operating environment includes client systems 210, e.g., enterprise desktop computing systems connected via network to one or more administrative systems 220, e.g., a remote site used for management of the enterprise client systems 210. The example operating environment further includes a third party system 230, e.g., a trusted third party used for security purposes, for example a device manufacturer.

As will be understood by further review of this description, the operating environment may include more or fewer devices than illustrated in the example operating environment of FIG. 2. For example, the devices of FIG. 2 may be consolidated to fewer devices, e.g., an administrative system 220 and a third party system 230 may be combined. Moreover, while certain terms have been adopted (e.g., administrative system, third party system), these are given only by way of example and may be modified as is appropriate. For example, the administrative system 220 may not be physically remote, and other device(s) may be used, so long as the functionality ascribed to the particular device is accomplished and is commensurate with this disclosure.

Figure 3:
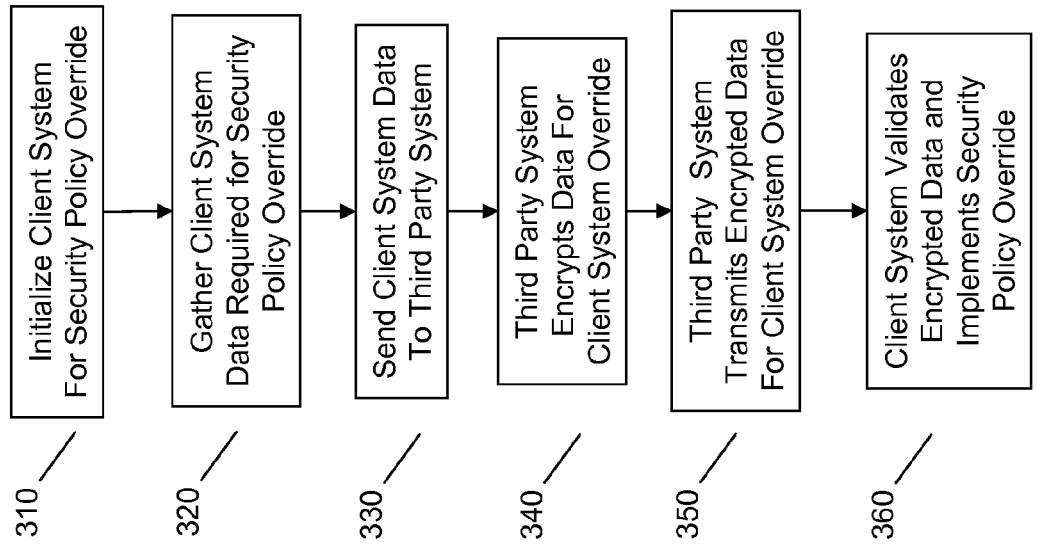
FIG. 3 illustrates an example method of targeted security policy override.

Turning to FIG. 3, an example process for targeted security policy override is illustrated. The example process focuses on a BIOS security policy override and includes the following example steps. At 310 a client system is initialized for security policy override. For example, running a utility at a central cite (e.g., an administrative system 220), unique data is gathered from the client devices (e.g., client systems 210). For example, the utility may collect client descriptive data (e.g., machine type, model, serial number, etc., referred to herein as "SMBIOS data"). The SMBIOS data describes the particular machine; however, since this data may be changed by the user, it is may be used simply as an indicator of which system is associated with a requested security policy change. In other words, there is no particular security relevance to this SMBIOS data.

The utility may further collect data that is unique to the hardware of the client system (referred to herein as "HDR_Unique"). For example, a client system has a unique number initialized in hardware and only available to the BIOS. In an example, the utility hashes this number with a random number (referred to herein as "Random_Number"—sent or made available to the BIOS, as further described herein). This number is only known to the client system so as to prevent a replay attack. Other information may be collected in addition to or in lieu of this information, so long as the information is sufficient to identify the client system in a targeted/unique way with security.

As part of initializing the client system at 310, the utility sends to the BIOS of the client system a user key that will be used in a later step. The user key may include for example a symmetric key (referred to herein as "User_Key"). This example of a symmetric key is non-limiting, as other cryptographic techniques may be employed. As above, the Random_ Number (referred to above to prevent replay attack) is sent to the client system.

At 320, data required for the security policy override is gathered. For example, an embodiment takes the data retrieved from the client system and generates a unique unlock key for the particular client system. The data may be authenticated at the client that the user requested the change in order to validate the requested change. In an embodiment, an unlock key (referred to herein as "Unlock_key") to be used later to unlock client is generated, e.g., Unlock_key=Hash (SMBIOS data|HWR_Unique|Random_Number). This Unlock_key may be encrypted.

At 330, this encrypted data may be sent to a third party system for confirmation. Thus, a third party system (e.g., a service provided by a client system manufacturer) may receive the following data for each client system to be overridden: Encrypted_Unlock_Key; and SMBIOS data. Thus, the unlock key (or a plurality of unlock keys in the event of more than one client system being overridden) is/are sent back to a third party system (e.g., a manufacturer of the devices) with a request to override security thereof.

At 340, the third party system encrypts the unlock key(s) with a private key and the User_Key (held by the third party and by the client system(s), as described herein in connection with step 310). Therefore, the third party system encrypts the client data (client system data of client system requesting the change). This step insures the third party system approves of the override transaction.

The encrypted data from the third party system is referred to herein as "Approval_data". This Approval_data may include information regarding the policy to be overridden, such as attributes of the security policy to be overridden (e.g., portions of the BIOS affected, referred to herein as "Policy_Override_Attributes"). For example, an embodiment encrypts [Unlock_Key|Policy_Override_Attributes] with User_Key (and a private key in the example of private/public key encryption). This also helps ensure that the end user actually approved the transaction.

This Approval_data, along with client identifiers (e.g., SMBIOS data) is sent back to the requester (e.g., administrative system 220), and the Approval_data is forwarded to the particular client system(s) (e.g., using the SMBIOS data), which in turn may be used by the client system to override the resident security policy. Thus, SMBIOS data is an indicator of which system(s) Approval_data can be applied to.

Thus, at 350, the encrypted unlock key(s) (with the appropriate attributes, if any) are transmitted from the third party system back to the requester. In step 360, at a client system, the encrypted unlock keys are presented to the BIOS of the client system. The BIOS of the client system, since it has all of the data collected in step 310, a public key, and has the User_Key established in step 210, decrypts the unlock key(s) and establishes whether the request is legitimate (e.g., by verifying the decrypted unlock key matches client system information gathered in step 210). If legitimate, the BIOS of the client system permits override of security policy of the BIOS.

For example, at the client system, a utility of the client system validates SMBIOS data, as this request is unique only for the targeted client system. If SMBIOS data is valid (matches the particular client system in question), the client utility sends Approval_data to the BIOS. For example, Approval_data may be sent to the BIOS by SMI or via BIOS mailbox message. The client system can validate the received request by determining if:

Encrypted_Unlock_Key=decrypted (Approval_Data, Third_Party_Public_Key)

and

Unlock_Key|Policy_Override_Attributes=Decrypted (Encrypted_Unlock_Key, User_Key)

The client BIOS can validate Unlock_Key as it has all the data that originally utilized to generate this data value. If validated, BIOS can then allow the requested policy overrides to be implemented.

An advantage of this process is that it targets the override(s) only to the client(s) that are specified by the requesting customer, e.g., by virtue of the client specific information involved. This does not expose other users to the override, which is a fragility of existing solutions, as described herein.

In brief recapitulation, an embodiment runs a utility which gathers unique data from the client system. For example, the utility collects the following: Hash of data unique for the client system (e.g., a machine descriptor); and, a random number (which may be saved on the client system). In addition to gathering the this client system data, the utility sends to the BIOS of the client system a user key which will be used in a latter decryption step by the client system. The utility takes the data gathered with respect to the client system and generates a unique unlock key for this particular client system. A list of such unlock keys are then sent to a third party with a request to override security policy. The third party encrypts this list with a private key held by the third and by the user key (held by the client system). In addition, the third party may add attributes the unlock key list (e.g., so that only targeted areas of the BIOS can be overridden. The "signed" list (with the appropriate utilities, if any) then may be sent back to the requesting customer (e.g., administrator). At the client systems, an additional utility may present the signed list to the BIOS. The BIOS of each client system, since it has all of the data collected in the initial process, a public key, and the user key, is enabled to decrypt the list and establish whether the request is legitimate. If so, the BIOS allows override(s) of security procedures.

As will be readily understood by those of ordinary skill in the relevant art, embodiments provide methods to override BIOS security in a targeted manner in an enterprise setting. The various mechanisms for security override result in the ability for system administrators to confidently complete multiple security overrides in enterprise systems, allowing for, e.g., convenient updating of software normally secured by BIOS security measures that require manual intervention. The embodiments described herein therefor provide benefits to the administrative user(s) by allowing remote override of BIOS security mechanisms for convenient management of enterprise client devices in a targeted way.

While the various example embodiments have been described in connection with personal computing devices such as desktop computers in an enterprise setting, these were provided as non-limiting examples. Accordingly, while specific example embodiments have been described that may be used to override BIOS security policy in enterprise desktop computing systems, similar advantages will be apparent to those having ordinary skill in the art when the features of various embodiments are applied in similar contexts. Similarly, although examples involving overriding BIOS security desktop computing devices have been used in the description, embodiments may be utilized in connection with other types of devices and in other security settings, for example, to override similar security policies in other operating environments and in other devices.

It will also be understood that the various embodiments may be implemented in one or more information handling devices configured appropriately to execute program instructions consistent with the functionality of the embodiments as described herein. In this regard, FIG. 1 illustrates a non-limiting example of such a device and components thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   gathering, with an information handling device, client system identification data of a client system;
   providing, with the information handling device, the client system with at least one cryptographic key;
   generating, with the information handling device, an unlock key;
   transmitting, with the information handling device, the client system identification data, the unlock key, and a request to a third party system;
   receiving, with the information handling device, encrypted approval data from the third party system; and
   transmitting, with the information handling device, encrypted approval data, comprising the unlock key, to the client system, wherein the encrypted approval data, if legitimate, allows overriding of a security policy of targeted areas of a low-level control program of the client system.

2. The method of claim 1, wherein the at least one cryptographic key provides the client system a decryption capability for decrypting the encrypted approval data.

3. The method of claim 1, wherein the encrypted approval data further comprises security policy attributes indicative of permitted security policy changes.

4. The method of claim 1, wherein the encrypted approval data is encrypted by the third party using the at least one cryptographic key provided to the client system.

5. The method of claim 4, wherein the encrypted approval data is encrypted by the third party using at least one additional key.

6. The method of claim 5, wherein the at least one additional key is a private key of a public/private key pair.

7. The method of claim 1, wherein the client system identification data comprises a client system hardware identification.

8. The method of claim 7, wherein the client system hardware identification comprises one or more of a machine type, a model number and a serial number.

9. The method of claim 1, wherein the client system comprises an enterprise computing system, wherein the information handling device comprises an enterprise administrative system, and wherein the third party comprises a third party system operated by a manufacturer of the client system.

10. The method of claim 1, wherein the encrypted approval data from the third party further comprises one or more added attributes such that only targeted areas of a Basic Input/Output System (BIOS) of the client system can be overridden.

11. An information handling device, comprising:
one or more processors; and
a memory operatively coupled to the one or more processors that stores instructions executable by the one or more processors to perform acts comprising:
gathering client system identification data of a client system;
providing the client system with at least one cryptographic key;
generating an unlock key;
transmitting the client system identification data, the unlock key, and a request to a third party system;
receiving encrypted approval data from the third party system; and
transmitting encrypted approval data, comprising the unlock key to the client system, wherein the encrypted approval data, if legitimate, allows overriding of a security policy of targeted areas of a low-level control program of the client system.

12. The information handling device of claim 11, wherein the at least one cryptographic key provides the client system a decryption capability for decrypting the encrypted approval data.

13. The information handling device of claim 11, wherein the encrypted approval data further comprises security policy attributes indicative of permitted security policy changes.

14. The information handling device of claim 11, wherein the encrypted approval data is encrypted by the third party using the at least one cryptographic key provided to the client system.

15. The information handling device of claim 14, wherein the encrypted approval data is encrypted by the third party using at least one additional key.

16. The information handling device of claim 15, wherein the at least one additional key is a private key of a public/private key pair.

17. The information handling device of claim 11, wherein the client system identification data comprises a client system hardware identification.

18. The information handling device of claim 17, wherein the client system hardware identification comprises one or more of a machine type, a model number and a serial number.

19. The information handling device of claim 11, wherein the client system comprises an enterprise computing system, wherein the information handling device comprises an enterprise administrative system, and wherein the third party comprises a third party system operated by a manufacturer of the client system.

20. A program product, comprising:
a storage device having computer program code embodied therewith, the computer program code comprising:
computer program code that gathers, with an information handling device, client system identification data of a client system;
computer program code that provides, with the information handling device, the client system with at least one cryptographic key;
computer program code that generates, with the information handling device, an unlock key;
computer program code that transmits, with the information handling device, the client system identification data, the unlock key, and a request to a third party system;
computer program code that receives, with the information handling device, encrypted approval data from the third party system; and
computer program code that transmits, with the information handling device, encrypted approval data, comprising the unlock key to the client system, wherein the encrypted approval data, if legitimate, allows overriding of a security policy of targeted areas of a low-level control program of the client system.

* * * * *